Figure 1:
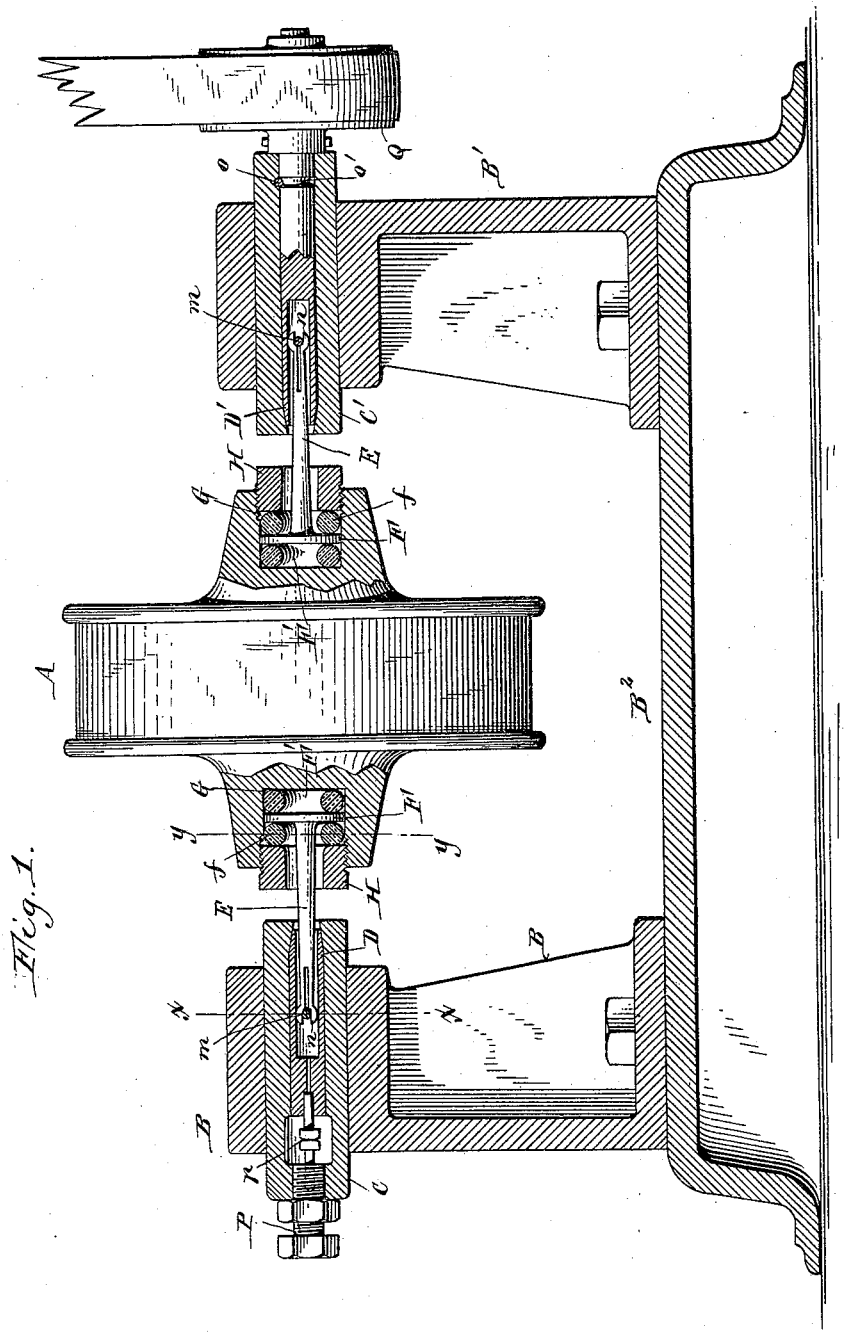

(No Model.)
2 Sheets—Sheet 1.

C. G. P. DE LAVAL.
ROTATING SHAFT.

No. 431,749. Patented July 8, 1890.

Witnesses:
Theo. L. Popp.
Jacob Nupenblatt.

Carl Gustaf Patrik de Laval,
Inventor.
By Edward Wilhelm
Attorney.

(No Model.) 2 Sheets—Sheet 2.
C. G. P. DE LAVAL.
ROTATING SHAFT.
No. 431,749. Patented July 8, 1890.
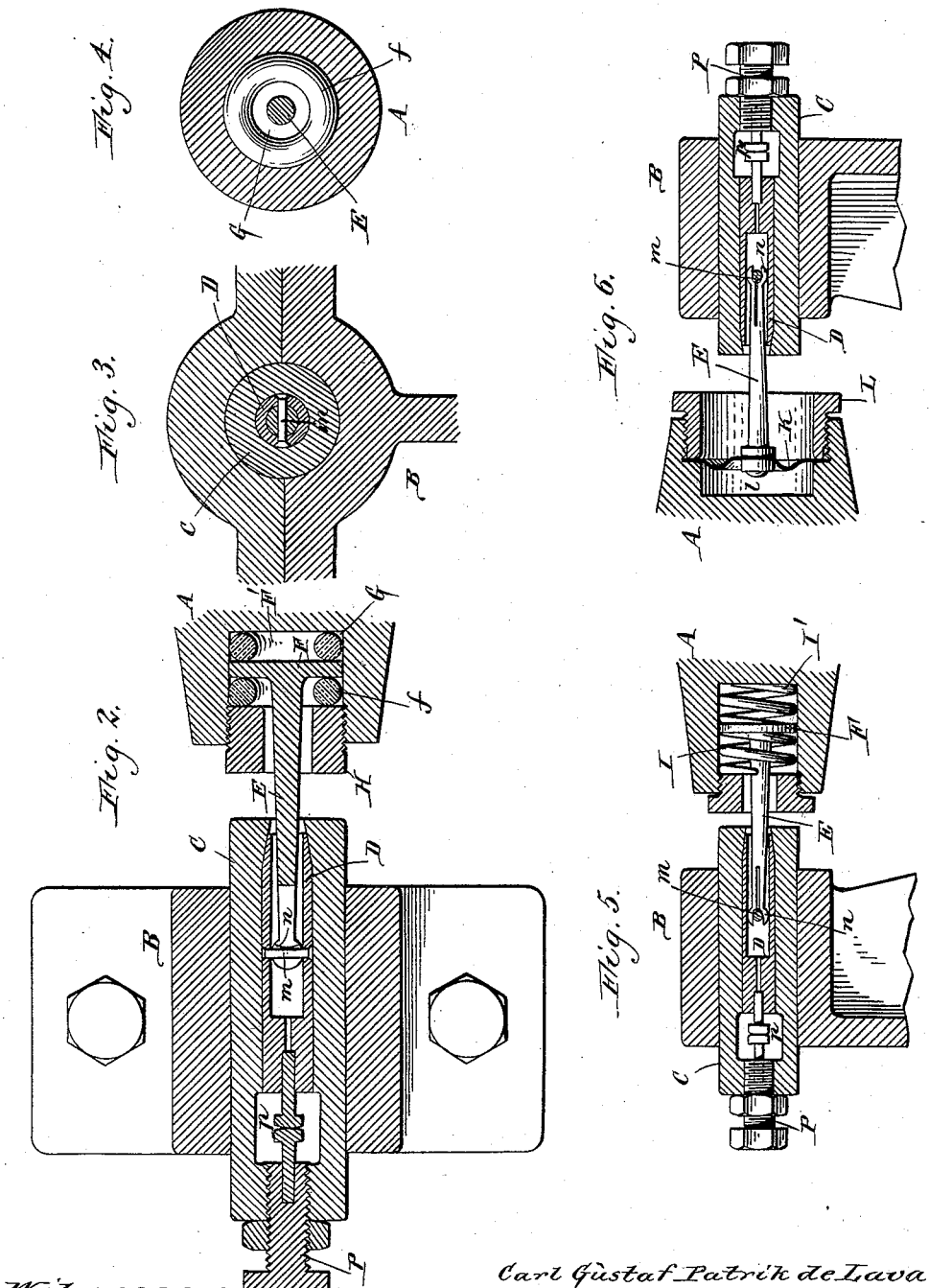
Witnesses:
Theo. L. Popp.
Jacob Nusenblatt
Carl Gustaf Patrik de Laval,
Inventor,
By Edward Wilhelm
Attorney.

ance, as a steam-turbine, dynamo-

UNITED STATES PATENT OFFICE.

CARL GUSTAF PATRIK DE LAVAL, OF STOCKHOLM, SWEDEN.

ROTATING SHAFT.

SPECIFICATION forming part of Letters Patent No. 431,749, dated July 8, 1890.

Application filed April 22, 1890. Serial No. 348,997. (No model.)

*To all whom it may concern:*

Be it known that I, CARL GUSTAF PATRIK DE LAVAL, a subject of the King of Sweden, and a resident of Stockholm, Sweden, have invented certain new and useful Improvements in Rotating Shafts, of which the following is a specification.

This invention relates to that class of machine-shafts which rotate with very high velocities and support bodies of considerable weight—for instance, the shafts of dynamo-machines, cutting-machines, steam-turbines, &c. In machines of this kind the finest possible adjustment and balancing of the rotating parts and abundant lubrication do not prevent uneven and excessive wear and frequent heating of the surfaces which are in frictional contact.

The object of my invention is to render this fine adjustment and balancing unnecessary and to render the machine self-adjusting and self-balancing, so that the machine can be operated at a very high rotative speed with safety and without excessive wear and undue expenditure of power.

In the accompanying drawings, consisting of two sheets, Figure 1 is a sectional elevation of my improved shaft supporting a steam-turbine or other rotating body. Fig. 2 is a longitudinal section of one of the shaft-journals and connecting parts on an enlarged scale. Figs. 3 and 4 are vertical transverse sections in lines $x\ x$ and $y\ y$, Fig. 1, respectively, on an enlarged scale. Figs. 5 and 6 are fragmentary sectional elevations of shaft-journals, showing modified constructions.

Like letters of reference refer to like parts in the several figures.

A represents a rapidly-rotating body—such, for instance, as a steam-turbine, dynamo-machine, cutter, or any other machine or appliance which rotates at a high speed.

B B' represent standards arranged on opposite sides of the rotating body and supported on a base $B^2$.

C C' represent the fixed bearings arranged, respectively, in the heads of the standards B B'.

D D' represent journals revolving in the fixed bearings C C', and provided with cavities which open inwardly or toward the rotating body.

E E' represent shaft-sections which connect the rotating body with the journals D D', so that the body A, the shaft-sections, and the journals rotate together in the fixed bearings. The shaft-sections are flexibly connected at their inner ends with the rotating body, so that the latter can move out of the axial line of the bearings when necessary in order to find a position in which it can rotate without vibrations. This flexible connection can be established in a variety of ways.

In the constructions represented in Figs. 1, 2, 3, and 4 the inner end of each shaft-section is provided with a disk or flange F, standing at right angles to the shaft and arranged in a socket or cavity G, formed in the hub of the rotating body. A rubber ring F' is arranged between the disk F and the bottom of the cavity, and a similar ring $f$ is arranged between the outer side of the disk and an adjustable annular cap H, secured in the outer portion of the cavity. These elastic rings or annular springs hold the shaft-sections normally in the axial line of the rotating body, but permit the shaft-sections to be deflected out of this line. By adjusting the cap H the pressure upon the springs can be increased or reduced.

In the construction represented in Fig. 5 spiral springs I I' are substituted for the rubber rings.

In the construction represented in Fig. 6 the inner end of the shaft is secured to a flexible diaphragm K, which is clamped between a shoulder $l$, formed in the cavity of the hub, and an annular cap L.

Each of the journals D D' is provided in its cavity with a transverse pin $m$, which is straddled by the split or bifurcated outer end of the shaft-sections. The latter are provided at their outer ends with spherical heads $n$, which fit in the cavities of the journals and permit the shaft to rock on the pin $m$. The slot or opening in the end of the shaft permits the latter to move lengthwise in the journals as the rotating body moves toward and from the axial line of the bearings. The inner end of each journal is preferably tapered and held in a tapering seat in the inner end of the bearing in which it revolves. The journal D' is held against lengthwise movement in its bearing by a transverse pin $o$, secured in the bearing and engaging in a groove $o'$ in the journal, or by any other suitable means. The journal D is held against longitudinal movement by a pin $p$, which is held against the outer end of the journal by a hollow screw P, arranged in the outer end of the bearing.

Q represents a pulley, gear-wheel, or other transmission device mounted upon the journal D'. When the rotating body is a motor, this device is used for transmitting power from the journal, and when the rotating body is a machine which requires power for its operation the transmission device is used for transmitting power to the journal.

My improved flexible shaft permits the rotating body to adjust itself toward and from the axial line of its bearings while in rotation until it assumes the position in which it runs steadily. This is of great importance in machines in which the rotating part makes many thousand revolutions per minute, because it does away with the necessity of accurately balancing the rotating parts, which is in any case a difficult and expensive operation and prevents the transmission of vibrations to the bearings, so that the rotating body can be operated at a high rate of speed with safety and without requiring an undue expenditure of power or causing uneven or excessive wear.

I do not wish to claim in this application the construction of the flexible or yielding shaft, broadly, because it is claimed in another application filed by me of even date herewith—to wit, Serial No. 348,998, filed April 22, 1890.

I claim as my invention—

1. The combination, with a rotating body and its fixed bearings, of shaft-sections flexibly connected at their inner ends with the rotating body and supported at their outer ends in said bearings, substantially as set forth.

2. The combination, with a rotating body and its fixed bearings, of shaft-sections provided at their inner ends with enlargements, and springs arranged between said enlargements and the adjacent portions of the rotating body, substantially as set forth.

3. The combination, with a rotating body and its fixed bearings, of shaft-sections provided at their inner ends with flanges arranged in cavities in the rotating body, springs arranged in said cavities on the inner and outer sides of said flanges, and caps bearing against the outer springs, substantially as set forth.

4. The combination, with a rotating body and its fixed bearings, of journals arranged in said bearings, and shaft-sections connected at their inner ends with the rotating body and having outer spherical ends which are connected with said journals, substantially as set forth.

5. The combination, with a rotating body and its fixed bearings, of hollow journals arranged in said bearings and provided with transverse pins, and shaft-sections connected at their inner ends to said rotating body and having their split outer ends engaged with the pins of the journals, substantially as set forth.

In testimony that I claim the foregoing as my invention I have signed my name, in presence of two witnesses, this 14th day of October, 1889.

CARL GUSTAF PATRIK DE LAVAL.

Witnesses:
NERE A. ELFWING,
A. W. ALMQVIST.